March 28, 1961 J. H. BOICEY 2,977,450
TRANSPARENT ELECTRICALLY CONDUCTING FILMS
Filed Dec. 16, 1957
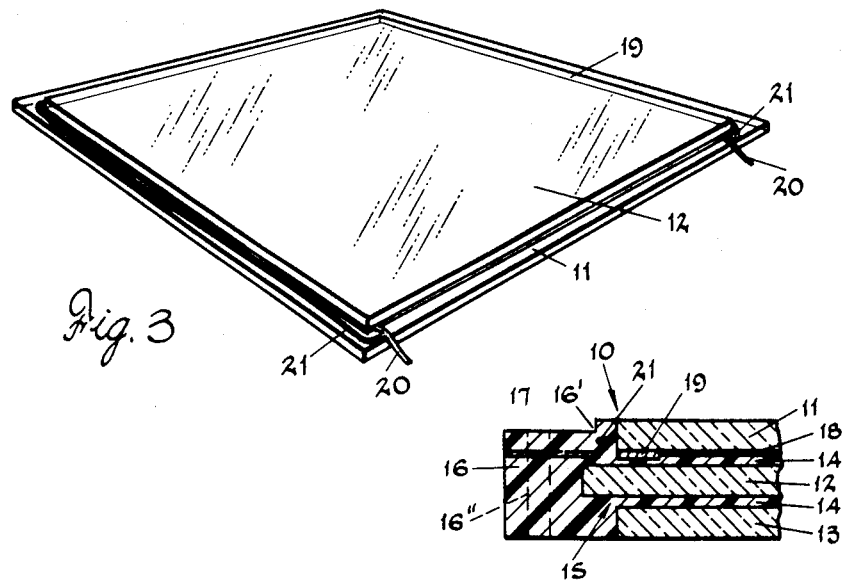
Fig. 3
Fig. 1
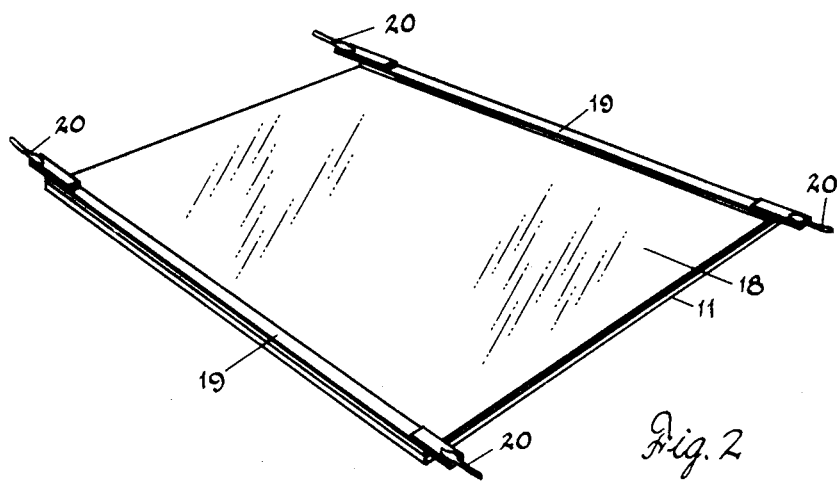
Fig. 2
INVENTOR.
James H. Boicey
BY
Nobbe & Swope
ATTORNEYS ововат
United States Patent Office 2,977,450
Patented Mar. 28, 1961

2,977,450
TRANSPARENT ELECTRICALLY CONDUCTING FILMS

James H. Boicey, Toledo, Ohio, assignor to Libbey-Owens-Ford Glass Company, Toledo, Ohio, a corporation of Ohio Filed Dec. 16, 1957, Ser. No. 703,068

1 Claim. (Cl. 219—19)

The present inventon relates broadly to transparent electrically conducting films or coatings on glass or other vitreous materials, and more particularly to the electrical connections to such films or coatings.

The use of transparent substantially colorless electrically conducting films of, for example, tin oxide, is well known; and de-icing windshields or windows for aircraft which utilize such films on a glass sheet that is provided with spaced metallic electrodes have been employed successfully in commercial aircraft. However, due to severe mechanical and thermal shocks normally met in inflight conditions, breakage or parting of the electrodes used with these transparent conducting films has been encountered. Breakage of the electrodes in this manner causes arcing across the fracture line which may extend into the viewing area and, in any event, results in failure which exhibits itself in fogging or icing of at least portions of the viewing area of the window or windshield.

It is therefore a primary object of the invention to insure that the transparent electrically conducting coating on a de-icing window is furnished with an adequate supply of electrical current throughout its area even in case of a transverse fracture of an electrode.

Another object of this invention is to insure that an electrical connection is maintained from the electrical power source to all portions of the electrodes when a transverse fracture of the electrode occurs.

Other objects and advantages of the invention will become more apparent during the course of the following description when taken in connection with the accompanying drawings.

In the drawings wherein like numerals are employed to designate like parts throughout the same:

Fig. 1 is a fragmentary, cross-sectional view through the margin of one type of glazing unit with which the present invention may be used:

Fig. 2 is a perspective view of one element of the glazing unit of Fig. 1 showing the invention incorporated therewith; and Fig. 3 is a perspective view of a complete glazing unit constructed according to this invention but without an extended plastic edge.

Referring now particularly to Fig. 1 of the drawings, this is a fragmentary view of a typical de-icing windshield or window 10 which comprises an outboard lite of glass 11, a center lite of glass 12 and an inboard lite of glass 13. These three lites are laminated together with plastic innerlayers 14 to form a composite unit; and the plastic portion of the unit may be built up or otherwise formed as at 15 to extend outwardly beyond the edges of the glass sheets and provide a so-called plastic attaching flange. This flange 16 may be reinforced, as with a metal frame member 17 and may be rabbeted as at 16' and drilled as at 16" to permit the glazing unit to be mounted in an airplane with the outer surface of the outboard lite 11 flush with the outer surface of the skin of the ship.

For the purpose of di-icing the glazing unit 10 in the manner already described, the outboard lite 11 is conventionally provided with a transparent electrically conducting film 18 on its innersurface, and with suitable electrodes 19 for supplying electrical current to the film 18.

In producing a glazing unit such as that illustrated in Fig. 1 in accordance with the present invention, a sheet of glass which is to subsequently become the outboard lite of the unit, is first provided with electrodes 19 along a pair of opposed margins as illustrated in Fig. 2.

Satisfactory electrodes have been produced by spraying copper or copper alloys onto the sheet edges or by firing on mixtures of powedered silver, gold or platinum and a glass frit. The electrodes of the preferred embodiment described herein are composed of silver-frit which is fired onto the surface of the glass sheet 11 during heating thereof preparatory to filming.

A customary method of applying the electrically conducting film is by spraying a solution of a metal compound, such as a tin halide in alcohol, onto a surface of the glass sheet and into contact with the electrodes after the sheet has been heated to substantially the point of softening of the glass.

At this point in the production of conventional laminated de-icing glazing units, it is customary to solder to one end of each of the electrodes 19, a suitable electrical lead. According to the present invention, however, leads 20 are soldered or otherwise placed in fixed electrical contact with opposite ends of each of the electrodes 19; also in accordance with the invention a shorting wire 21 is secured to and between the pair of leads on each electrode, both for reasons to be more clearly hereinafter set forth.

After completion of the attachment of the electrically conducting film and of the electrical connections to said film on a surface of the glass sheet 11, the same is laminated, together with additional sheets of glass and interposed layers of plastic material, under heat and pressure, to produce a completed transparent de-icing glazing unit 10 as illustrated in Fig. 1.

When it is desired to de-ice the window 10 an electrical potential is applied between the electrodes 19 which causes an electric current to flow through the film 18 and in that manner heats the glass sheet 11 to a temperature at which any ice or fog which may be present on the surface of the outboard lite will be vaporized.

As explained above, de-icing windows of the general nature described herein have heretofore been connected to their power source by means of a single lead to each electrode, and whenever these electrodes of the prior known structures developed transverse fractures due to either thermal or mechanical shocks, or a combination of both, arcing developed across the lines of fracture which in many cases was visible to the pilot either directly or because of the burn blackened appearance when the arcing migrated into the viewing area of the window. These transverse fractures of course also resulted in the current supply to at least part of the conducting film being cut off, and in the failure of that portion of the film to perform its de-icing function properly. In any event, whether from blackening or icing, the pliot's vision was obscured and ice, frost or fog was allowed to build up.

According to the present invention on the other hand, electrical connection between the power source (not shown) is made to each extremity of each of the electrodes 19. As shown in Fig. 3 this connection may be provided by a shorting wire 21 connected between the pair of contacts 20 at opposite ends of each electrode. In a completed unit the shorting wire 21 is preferably enclosed by the plastic mounting body 16 (Fig. 1) and in this way is protected from damage or accidental shorting to the frame of the aircraft.

Now, with the special connection of this invention, if a break should occur, whether partial or complete, at any point in an electrode of a de-icing window, electrical power will still be supplied to all portions of the electrode because the contacts at opposite ends of the electrode will supply current to the electrode on both sides of the fracture. Accordingly, no difference in electrical potential will exist across the line of fracture and thus arcing will not occur. Also, because the electrode will be supplied with electric power throughout its length, the conducting film 18 will pass a substantially uniform current and the removal of ice, frost or fog will continue to be correspondingly uniform.

Although the invention is illustrated and described in the preferred embodiment as having two points of electrical connection on each electrode, it is considered within the scope of the invention that there may be more than two points of connection. Also, although shown with a de-icing window having a plurality of sheets it is also considered to be equally applicable to a single sheet of glass incorporating a film and electrodes thereon, or to a glazing unit incorporating a plurality of sheets and a plurality of conducting films thereon.

In fact it is to be understood that the form of the invention herewith shown and described is to be taken as a preferred embodiment of the same only, and that various changes in the shape, size and arrangement of parts, or in specific procedures, may be resorted to without departing from the spirit of the invention or the scope of the subjoined claim.

I claim:

An electrically conducting glass unit, comprising a plurality of glass sheets, at least one plastic interlayer separating said glass sheets and bonded thereto said interlayer extending beyond the edges of said sheets to provide a flange, a transparent electrically conducting film on an inner surface of one of said glass sheets, a pair of elongated electrodes arranged in spaced relation on the sheet having the film and in electrical contact with said film, leads located at the extremities of each electrode for connecting said electrodes to a power source, and a shorting wire embedded in the flange connecting the respective leads of each electrode to one another.

References Cited in the file of this patent

UNITED STATES PATENTS

| | | |
|---|---|---|
| 2,205,543 | Rideau et al. | June 25, 1940 |
| 2,299,162 | Marick | Oct. 20, 1942 |
| 2,314,766 | Bull et al. | Mar. 23, 1943 |
| 2,507,036 | McCrumm et al. | May 9, 1950 |
| 2,513,993 | Burton | July 4, 1950 |
| 2,676,117 | Colbert et al. | Apr. 20, 1954 |
| 2,697,675 | Gaiser | Dec. 21, 1954 |
| 2,795,682 | Knoll | June 11, 1957 |